United States Patent [19]
Crawford et al.

[11] Patent Number: 5,516,134
[45] Date of Patent: May 14, 1996

[54] SEAT FOR A WHEELED VEHICLE

[75] Inventors: Kirk Crawford, Newland, N.C.; Elliott C. Grusky, Miami, Fla.

[73] Assignee: Perfect Season, Inc., Miami, Fla.

[21] Appl. No.: 309,107

[22] Filed: Sep. 20, 1994

[51] Int. Cl.⁶ ...................................................... A47C 3/12
[52] U.S. Cl. ..................... 280/288.1; 297/452.14
[58] Field of Search ................... 280/288.1, 274, 280/278, 279, 287, 281.1; 297/452.14, 452.31

[56] References Cited

U.S. PATENT DOCUMENTS

| | | | |
|---|---|---|---|
| 2,482,472 | 9/1949 | Fried | 280/288.1 X |
| 3,393,941 | 7/1968 | Grosfillex | 297/452.14 X |
| 3,583,759 | 6/1971 | Kramer | 297/452.14 X |
| 4,502,705 | 3/1985 | Weaver | 280/288.1 X |
| 5,419,574 | 5/1995 | Krumm | 280/288.1 X |

FOREIGN PATENT DOCUMENTS

| | | | |
|---|---|---|---|
| 568051 | 12/1958 | Canada | 280/288.1 |
| 620078 | 5/1961 | Canada | 297/452.31 |
| 2613603 | 2/1988 | France | 297/452.74 |

*Primary Examiner*—Kevin T. Hurley
*Attorney, Agent, or Firm*—Finnegan, Henderson, Farabow, Garrett & Dunner

[57] ABSTRACT

A vehicle seat has a generally L-shaped integral molded shell. The shell is molded with curves that effectively conform to and support the spine and hips of an occupant, including an ischial support portion, a lumbar vertebrae support portion, and a thoracic vertebrae support portion. The seat is particularly suited for use with a wheeled vehicle, such as a bicycle. The wheeled vehicle used with this seat further includes an adjustable pedal boom, and a hinged steering column, in order to fit the bike to the rider and provide further back comfort.

8 Claims, 4 Drawing Sheets

SEAT FOR A WHEELED VEHICLE

BACKGROUND OF THE INVENTION

1. Field of the Invention

The present invention relates to a vehicle seat. More specifically, the invention relates to a seat for use with a wheeled vehicle, such as a bicycle, which provides back support to the rider, and a wheeled vehicle designed to be used with such a seat attached.

2. Description of the Related Art

Seats used on wheeled vehicles such as bicycles, tricycles, motorcycles, and the like, are well known. Conventional bicycle seats, for example, typically consist of a saddle-type structure which support only the rider's hips and buttocks.

Conventional seats have numerous shortcomings, particularly for riders with weak backs or back injuries, or for riders who ride for long distances. The problems stem from the shape and position of the seat on the wheeled conveyance. The shapes of conventional seats offer the rider little or no back support, particularly to the thoracic, lumbar, and ischial portions of the rider's spine and hips, resulting in back pain and fatigue.

Recumbent bicycles are also known, with pedals above and in front of the front wheel. Even recumbent bicycles, however, do not provide a seat which adequately supports the rider's back, again resulting in back pain and fatigue.

It is an object of the present invention to provide a seat which provides back support to the rider. It is further an object of the present invention to provide a wheeled conveyance designed for use with such a seat.

SUMMARY OF THE INVENTION

To achieve the foregoing objects, and in accordance with the purposes of the invention as embodied and broadly described herein, a vehicle seat is provided. The vehicle seat includes a rigid generally L-shaped shell including a generally vertical back portion for supporting a spine of a human occupant. The back portion includes an upper edge, a thoracic vertebrae support portion proximate and below the upper edge curving away from the occupant, joining to a lumbar vertebrae support portion below the thoracic vertebrae support portion curving back toward the occupant, joining to lower portion curving back away from the occupant. The shell further includes a generally horizontal seat portion for supporting hips and pelvis of the human occupant, including a leading edge and two side edges, defining therebetween an ischial support portion curving up and joining the lower portion of the back portion.

In another aspect of the invention a wheeled vehicle is provided. The wheeled conveyance includes a front wheel and at least one rear wheel, a frame including a tubular elongated support bar extending between the front and rear wheels including a front end and a rear end, a rigid generally L-shaped seat attached to the support bar intermediate the front and rear ends, the seat including a thoracic vertebrae support curve, a lumbar vertebrae support curve, and an ischial support curve, means for steering the front wheel rotatably attached to the frame proximate the front end of the support bar, and a pedal boom extending from the front end of the support bar above the front wheel and terminating in a pair of foot pedals.

Preferably, the pedal boom has a length which is adjustable.

Preferably, the steering means includes a generally T-shaped column projecting from the frame terminating in a pair of handles, and includes a hinge positioned midway along a length of the column between the frame and the handles.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention. Together with the general description given above and the detailed description of the preferred embodiments given below, the drawings serve to explain the principles of the invention.

DESCRIPTION OF THE PREFERRED EMBODIMENTS

Reference will now be made in detail to the present preferred embodiments of the invention as broadly illustrated in the accompanying drawings.

The human spine typically has 24 vertebrae, including seven cervical (neck) vertebrae, twelve thoracic (upper back) vertebrae, and five lumbar (lower back) vertebrae. The spine also includes five sacral segments, and usually four coccygeal (tailbone) segments. The sacrum joins the hip bones and pelvic region. The hip includes the ischium, which is a bone forming the lower part of each side of the hip bone. The thoracic, lumbar, and ischial portions of the human body are depicted generally in FIG. 3.

Figure 1:
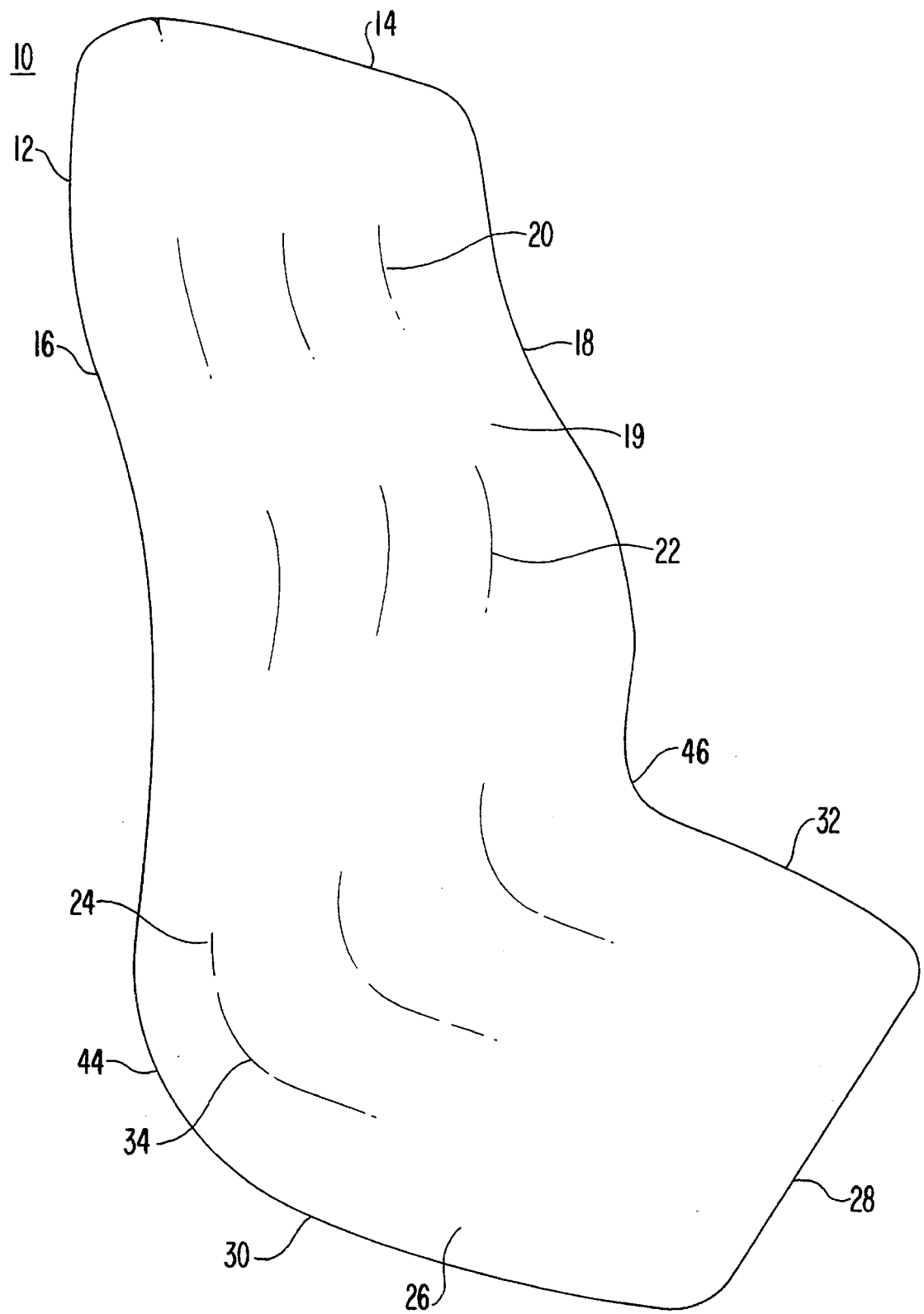
FIG. 1 is a perspective view of a vehicle seat in accordance with the present invention.

In accordance with the present invention, a vehicle seat comprises a rigid generally L-shaped shell. As broadly depicted in FIGS. 1 and 2, seat 10 includes a rigid shell 12, preferably molded as an integral unit of fiberglass, hard plastic or the like. The shell may be covered with padding or high density foam (not shown) for added comfort.

In accordance with the invention, the shell includes a generally vertical back portion for supporting a spine of a human occupant, the back portion including an upper edge, a thoracic vertebrae support portion proximate and below the upper edge curving away from the occupant, joining to a lumbar vertebrae support portion below the thoracic vertebrae support portion curving back toward the occupant, joining to a lower portion curving back away from the occupant. As broadly embodied herein, and referring to FIGS. 1 and 2, shell 12 includes an upper edge 14 and side edges 16, 18, defining a back portion 19. Below upper edge 14, the shell curves away from the occupant defining a thoracic vertebrae support curve 20, conforming generally to the outward curve of the thoracic vertebrae, as shown in FIG. 3. The shell below thoracic curve 20 then turns and curves back toward the occupant, defining a lumbar vertebrae support curve 22, conforming generally to the inward curve of the lumbar vertebrae, as shown in FIG. 3. The shell below lumbar curve 22 then turns and curves back away from the occupant to lower portion 24.

In accordance with the invention, the vehicle seat further comprises a generally horizontal seat portion for supporting hips and pelvis of the human occupant, the seat portion including a leading edge and two side edges defining therebetween an ischial support portion curving up and joining the lower portion of the back portion. As broadly embodied herein, and referring to FIGS. 1 and 2, shell 12 includes generally horizontal seat portion 26, having a leading edge 28 and two side edges 30, 32. The seat portion 26 between the leading and side edges curves up, joining with lower portion 24 of the seat back, thereby defining an ischial support curve 34. Ischial support curve 34 conforms generally to the hips and buttocks of the human occupant, and provides support to the ischium bones, as shown in FIG. 3.

Figure 2:
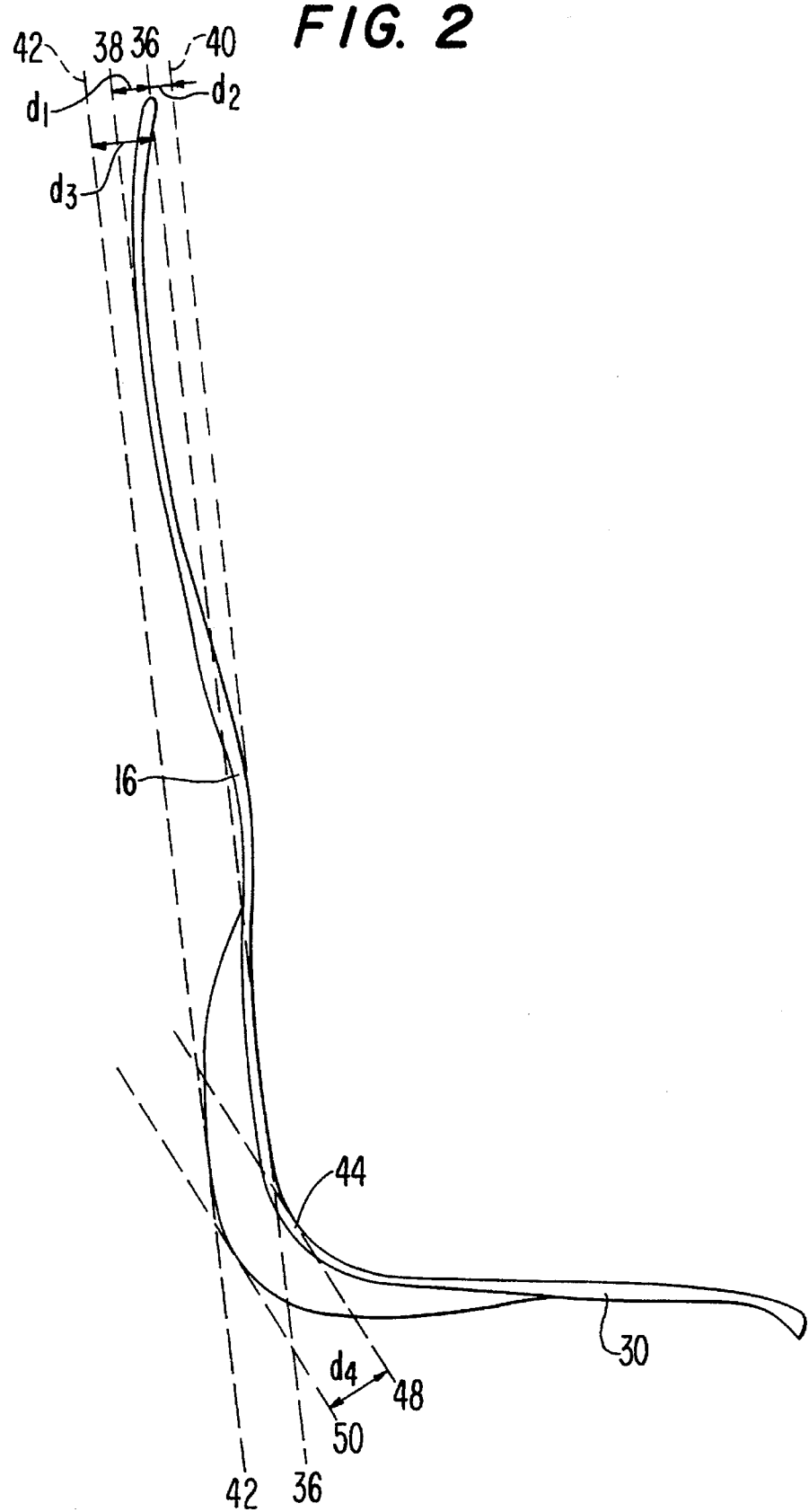
FIG. 2 is a side view of the vehicle seat depicted in FIG. 1.
Figure 3:
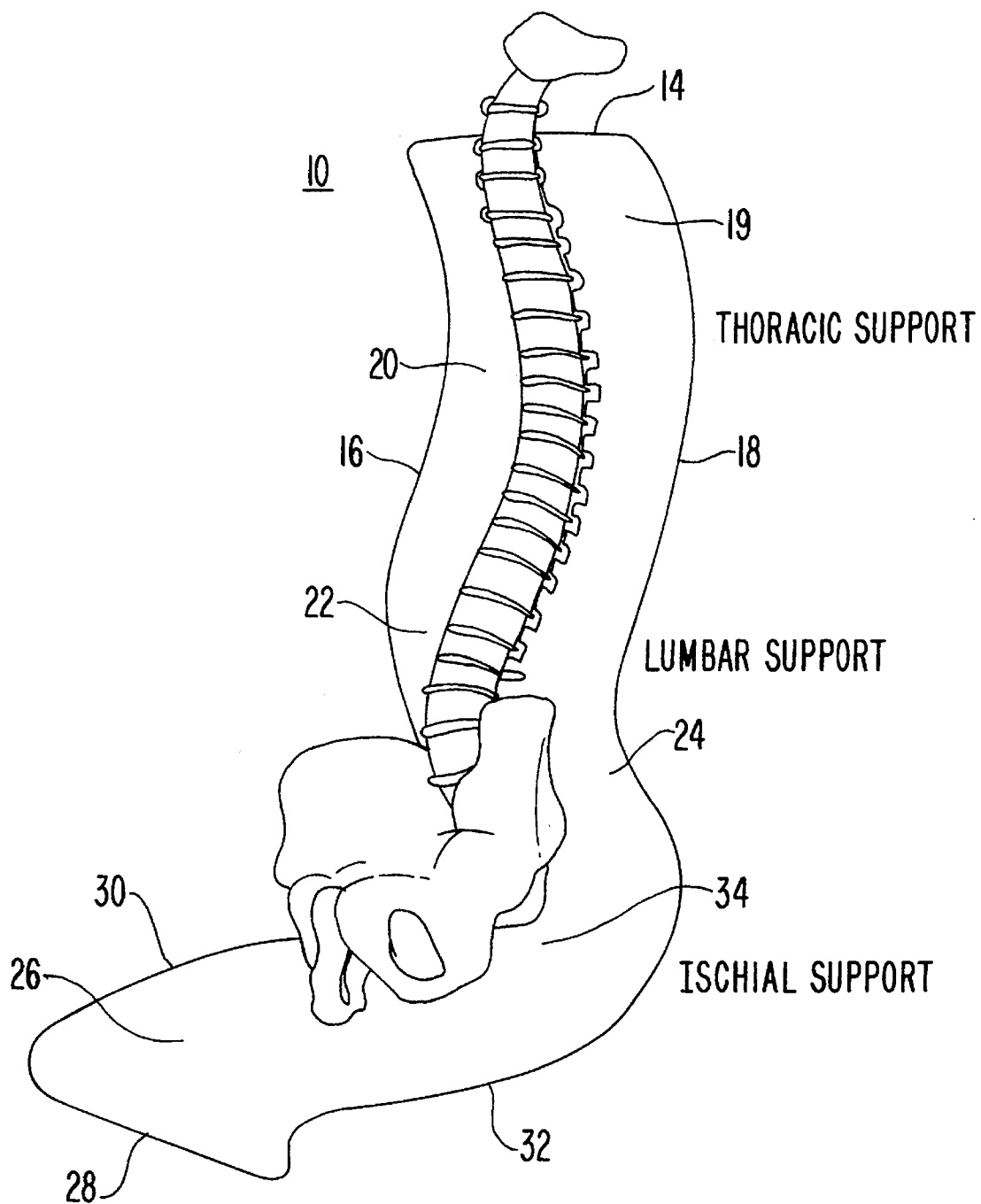
FIG. 3 is a perspective view of the vehicle seat similar to FIG. 1, further depicting an outline of a human occupant and demonstrating how a human spine is supported by the seat.

The depth of the various support curves in relation to one another is depicted broadly in FIG. 2. Back portion 19 defines a first generally vertical axis 36, shown by a dotted line. The outer periphery of thoracic vertebrae support curve 20 has a tangent line 38, shown by a dotted line, that is generally parallel to and spaced a first distance $d_1$, from vertical axis 36 in a direction away from the occupant, as described above, thereby conforming generally to the curve of the thoracic vertebrae. Likewise, an outer periphery of lumbar vertebrae support curve 22 has a tangent line 40 shown by a dotted line, that is generally parallel to and spaced a second distance $d_2$ from vertical axis 36 in a direction toward the occupant, as described above, thereby conforming generally to the curve of the lumbar vertebrae. Finally, the periphery of ischial support curve 34 has a tangent line 42 shown by a dotted line, that is parallel to vertical axis 36, spaced a distance $d_3$ from vertical axis 36. As can be seen in FIG. 2, distances $d_1$ and $d_2$ are substantially the same distance, whereas distance $d_3$ is greater than $d_1$ and $d_2$. That is, the ischial support curve 34 curves farther away from the axis of back portion 19 than do the thoracic support curve or the lumbar support curve, to conform generally to the more pronounced curves of the buttocks and hips. Additionally, referring to FIGS. 1 and 2, it can be seen that side edges 30, 32 of seat portion 26, join with side edges 16, 18 of back portion 19, at arcuate curves 44, 46 respectively. Tangent line 48, drawn along the periphery of arcuate curve 44, is spaced a distance $d_4$ toward the occupant from a parallel tangent line 50 drawn on a periphery of ischial support curve 34, thereby further conforming to the shape of the occupant's buttocks and hips.

The vehicle seat described above is suitable for use with any type of vehicle, including but not limited to bicycles, tricycles, motorcycles, automobiles, and so on. However, a preferred contemplated use of the seat is with a wheeled conveyance such as a bicycle, and more particularly with a short wheel base recumbent bicycle such as the one depicted in FIG. 4 and described below.

In accordance with the invention, a wheeled vehicle comprises a front wheel and at least one rear wheel. As broadly embodied in FIG. 4, bicycle 100 includes a front wheel 102 and rear wheel 104. Front and rear wheels 102, 104 are rotatably mounted on forks 106, 108 respectively.

Figure 4:
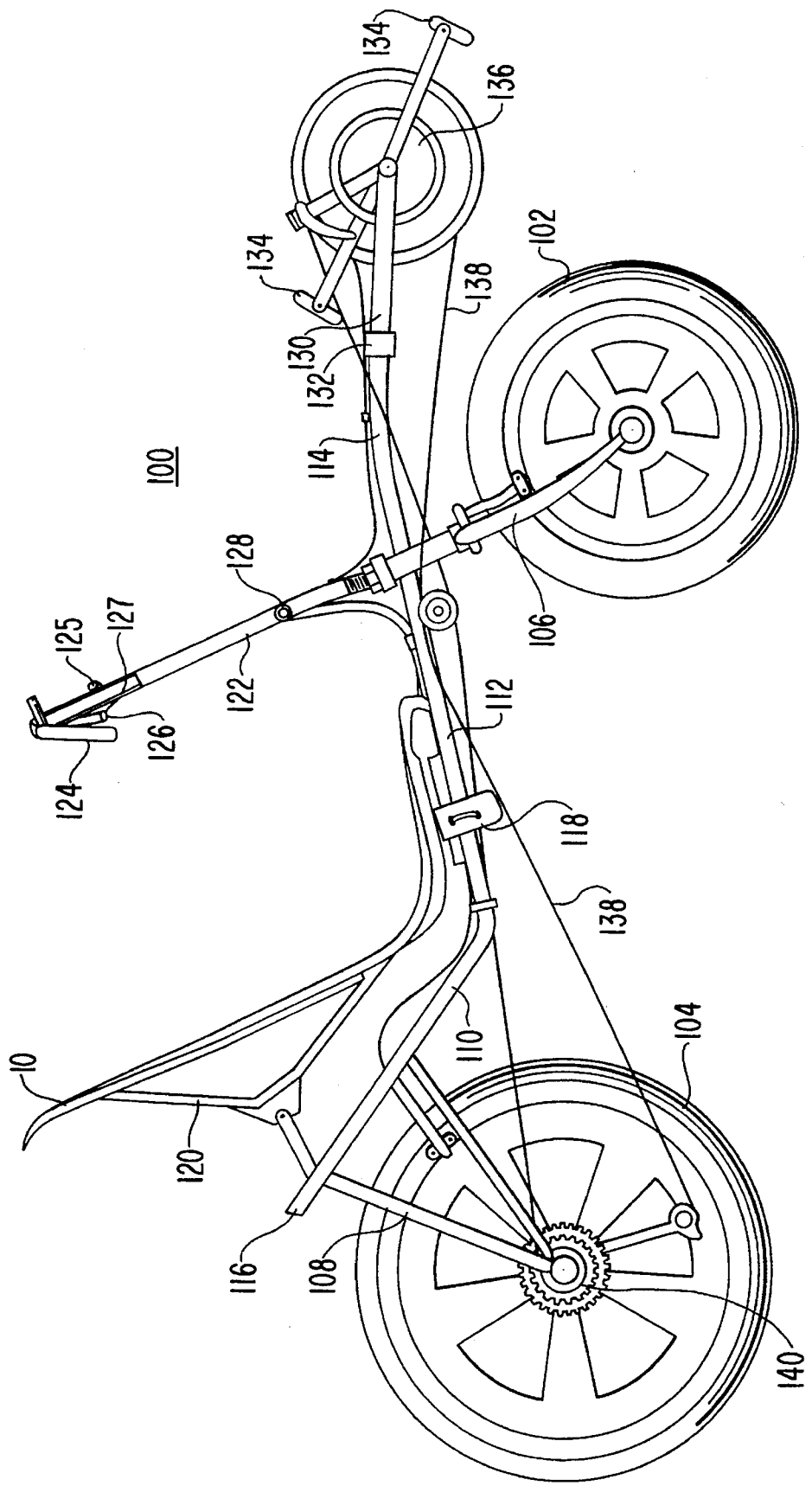
FIG. 4 is a side view of a wheeled vehicle in accordance with the invention, including the seat shown in FIG. 1.

In accordance with the invention, the wheeled vehicle further comprises a frame including a tubular elongated support bar extending between the front and rear wheels, including a front end and a rear end. Referring to FIG. 4, bicycle 100 includes a standard short wheel base recumbent frame 110, as is well known in the bicycle art, including a tubular elongated support bar 112. Support bar 112 terminates in front distal end 114 and rear distal end 116. The frame 110 can be made of high tensile steel or any of the various alloys known in the bicycle art which are strong, but extremely lightweight. Forks 106, 108 connect to the frame 110 as shown in FIG. 4.

In accordance with the invention, a rigid generally L-shaped seat is attached to the support bar intermediate the front and rear ends, the seat including a thoracic vertebrae support curve, a lumbar vertebrae support curve, and a ischial support curve. As embodied in FIG. 4, seat 10 attaches to support bar 112 with clips 118 and strut 120. Seat 10 is padded, and conforms in configuration to the vehicle seat described above, and depicted in FIGS. 1–3.

In accordance with the invention, means for steering the front wheel are rotatably attached to the frame proximate the front end of the support bar. As embodied in FIG. 4, steering column 122 is rotatably connected through frame 110 to front wheel fork 106. Steering column 122 branches into a T-shape with two handles 124, 126, for steering the bicycle. Although steering handles are shown here, other well-known steering devices, including a steering wheel or tiller-type arrangement could be used, and still fall within the scope of the invention.

Preferably, the steering column angles toward the rider, at approximately 45° from the vertical. It is further preferable that the steering column include a hinge-type device positioned midway along a length of the column between the frame and the handles. As broadly embodied in FIG. 4, steering column 122 includes midway along its length a hinge or ratchet assembly 128, which enables the steering column to be rotated toward or away from the seat 10, and locked into any one of a plurality of angles with respect to support bar 112 and seat 10. This hinge capability enables each individual bicycle rider to adjust the position of steering column 122 to the most comfortable position. As further embodied in FIG. 4, the length of steering column 122 also can be adjusted by loosening screw 125 and sliding telescopic stem portion 127 in or out of steering column 122.

In accordance with the invention, the wheeled vehicle further comprises a pedal boom extending from the front end of the support bar above the front wheel and terminating in a pair of foot pedals. As broadly embodied in FIG. 4, pedal boom 130 projects from front end 114 of support bar 112. Preferably, pedal boom 130 is tubular and fits slidably within support bar 112 in a telescopic manner, so that it can be slid in or out to adjust the length of the pedal boom. It is further preferred that a locking device 132 be included to fix the position of the pedal boom at any of a plurality of positions. Such a locking device 132 could be a conventional ball and detent locking device, a cotter pin and a plurality of aligned apertures in the support bar and pedal boom, a locking ring, or any other locking device known in the art. This capability enables each rider to adjust the length of the pedal boom to the most comfortable length for his legs.

The pedal boom 130 terminates in a pair of foot pedals 134. As broadly embodied herein, foot pedals 134 are connected to rotatable sprocket 136, which in turn is linked by a chain 138 to another sprocket 140 attached to rear wheel 104. A gear shift mechanism, deraileurs, and brakes can also be provided, as are well known in the bicycle art.

It has been discovered that use of the vehicle seat described above on a short wheel base recumbent bicycle provides support to a rider's thoracic vertebrae, lumbar vertebrae, and ischium, relieving back fatigue and enabling the rider to ride much longer distances at greater sustained speeds. Experiments have shown that the rider can use up to 60% more of the strength in his thigh muscles than in a conventional bicycle, because of the angle provided between the rider's hip and knee by this seat.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of applicants' general inventive concept.

We claim:

1. A vehicle seat comprising:

A rigid generally L-shaped shell, including a generally vertical back portion defining an axis for supporting a spine of a human occupant, the back portion including an upper edge, a thoracic vertebrae support portion proximate and below the upper edge curving away from the occupant, the thoracic vertebrae support portion having a first tangent line generally parallel to and spaced a first distance from the axis in a direction away from the occupant, joining to a lumbar vertebrae support portion below the thoracic vertebrae support portion curving back toward the occupant, the lumbar vertebrae support portion having a second tangent line generally parallel to and spaced a second distance from the axis in a direction toward the occupant, joining to a lower portion curving back away from the occupant; and a generally horizontal seat portion for supporting hips and pelvis of the human occupant, the seat portion including a leading edge and two side edges defining therebetween an ischial support portion curving up and joining the lower portion of the back portion, the ischial support having a third tangent line generally parallel to and spaced a third distance from the axis in a direction away from the occupant, wherein the first and second distances are substantially equal, and the third distance is greater than either the first distance or the second distance.

2. A wheeled vehicle according to claim 1, wherein a length of the pedal boom is adjustable.

3. A wheeled vehicle according to claim 2, wherein the pedal boom includes a generally tubular bar telescopically attached to the front end of the support bar.

4. A wheeled vehicle according to claim 1, wherein the steering means includes a generally T-shaped column projecting from the frame terminating in a pair of handles.

5. A wheeled vehicle according to claim 4, wherein the steering column includes a hinge positioned midway along a length of the column between the frame and the handles.

6. A wheeled vehicle comprising:

a front wheel and at least one rear wheel;

a frame including a tubular elongated support bar extending between the first and rear wheels including a front and a rear end;

a rigid generally L-shaped seat attached to the support bar intermediate the front and rear ends, the seat including a back portion defining an axis, a thoracic vertebrae support curve having a first tangent line generally parallel to and spaced a first distance from the axis in a direction away from an occupant of the seat, a lumbar vertebrae support curve having a second tangent line generally parallel to and spaced a second distance from the axis in a direction toward the occupant, and an ischial support curve having a third tangent line generally parallel to and spaced a third distance from the axis, wherein the first and second distances are substantially equal and the third distance is greater than either the first distance or the second distance;

means for steering the front wheel rotatably attached to the frame proximate the front end of the support bar; and a pedal boom extending from the front end of the support bar above the front wheel and terminating in a pair of foot pedals.

7. A wheeled vehicle according to claim 6, wherein the foot pedals are connected to a rotatable first sprocket linked via a chain to second sprocket attached to the rear wheel.

8. A vehicle seat comprising:

a rigid generally L-shaped shell, including a generally vertical back portion for supporting a spine of a human occupant, the back portion including an upper edge, a thoracic vertebrae support portion proximate and below the upper edge curving away from the occupant, joining to a lumbar vertebrae support portion below the thoracic vertebrae support portion curving back toward the occupant, joining to a lower portion curving back away from the occupant; and a generally horizontal seat portion for supporting hips and pelvis of the human occupant, the seat portion including a body edge and two side edges defining therebetween a planar portion proximate the leading edge for supporting the thighs of the occupant joining an ischial support portion curving up and joining the lower portion of the back portion.

* * * * *

UNITED STATES PATENT AND TRADEMARK OFFICE
CERTIFICATE OF CORRECTION

PATENT NO. : 5,516,134
DATED : May 14, 1996
INVENTOR(S) : Kirk Crawford and Elliott C. Grusky It is certified that error appears in the above-indentified patent and that said Letters Patent is hereby corrected as shown below:

Column 5, claim 2, line 1, change "1" to --6--.

Column 5, claim 4, line 1, change "1" to --6--.

Signed and Sealed this

Fifteenth Day of April, 1997

Attest:

BRUCE LEHMAN

Attesting Officer

Commissioner of Patents and Trademarks